United States Patent
Ganzel et al.

(10) Patent No.: US 11,142,178 B2
(45) Date of Patent: Oct. 12, 2021

(54) VEHICLE BRAKE SYSTEM WITH SECONDARY BRAKE MODULE

(71) Applicant: Kelsey-Hayes Company, Livonia, MI (US)

(72) Inventors: Blaise Ganzel, Ann Arbor, MI (US); Deron Craig Littlejohn, West Bloomfield, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 16/275,869

(22) Filed: Feb. 14, 2019

(65) Prior Publication Data

US 2019/0248348 A1 Aug. 15, 2019

Related U.S. Application Data

(60) Provisional application No. 62/630,519, filed on Feb. 14, 2018.

(51) Int. Cl.
| | |
|---|---|
| *B60T 13/74* | (2006.01) |
| *B60T 13/62* | (2006.01) |
| *B60T 8/40* | (2006.01) |
| *B60T 11/16* | (2006.01) |
| *B60T 8/17* | (2006.01) |
| *B60T 13/66* | (2006.01) |
| *B60T 17/06* | (2006.01) |
| *B60T 13/14* | (2006.01) |

(Continued)

(52) U.S. Cl.
CPC .............. *B60T 13/62* (2013.01); *B60T 7/042* (2013.01); *B60T 8/17* (2013.01); *B60T 8/4081* (2013.01); *B60T 11/165* (2013.01); *B60T 13/146* (2013.01); *B60T 13/662* (2013.01); *B60T 13/686* (2013.01); *B60T 13/745* (2013.01); *B60T 17/06* (2013.01); *B60T 8/4018* (2013.01); *B60T 2270/10* (2013.01); *B60T 2270/20* (2013.01); *B60T 2270/30* (2013.01); *B60T 2270/402* (2013.01)

(58) Field of Classification Search
CPC ........ B60T 13/62; B60T 13/66; B60T 13/662; B60T 13/68; B60T 13/686; B60T 13/74; B60T 13/741; B60T 13/745; B60T 8/4081; B60T 8/4018; B60T 8/4022
See application file for complete search history.

(56) References Cited

U.S. PATENT DOCUMENTS

| | | | | |
|---|---|---|---|---|
| 5,758,930 A | * | 6/1998 | Schiel | B60T 7/042 188/358 |
| 6,315,370 B1 | * | 11/2001 | Feigel | B60T 8/4275 303/115.2 |
| 8,038,229 B2 | | 10/2011 | Leiber et al. | |

(Continued)

*Primary Examiner* — Thomas J Williams
(74) *Attorney, Agent, or Firm* — Robert James Harwood

(57) ABSTRACT

A brake system has a wheel brake and is operable under a non-failure normal braking mode and a manual push-through mode. The system includes a master cylinder operable by a brake pedal during a manual push-through mode to provide fluid flow at an output for actuating the wheel brake. A first source of pressurized fluid provides fluid pressure for actuating the wheel brake under a normal braking mode. A secondary brake module includes a plunger assembly for generating brake actuating pressure for actuating the wheel brake under the manual push-through mode.

16 Claims, 5 Drawing Sheets

(51) Int. Cl.
*B60T 7/04* (2006.01)
*B60T 13/68* (2006.01)

(56) References Cited

U.S. PATENT DOCUMENTS

| | | | |
|---|---|---|---|
| 8,342,615 B2 * | 1/2013 | Drumm | B60T 8/4077 |
| | | | 303/20 |
| 8,371,661 B2 | 2/2013 | Leiber et al. | |
| 9,211,874 B2 | 12/2015 | Leiber et al. | |
| 9,340,193 B2 | 5/2016 | Ganzel | |
| 9,371,844 B2 | 6/2016 | Ganzel et al. | |
| 2011/0185723 A1 | 8/2011 | Ganzel | |
| 2012/0306261 A1 | 12/2012 | Leiber et al. | |
| 2013/0213025 A1 * | 8/2013 | Linden | B60T 8/4031 |
| | | | 60/327 |
| 2014/0265547 A1 * | 9/2014 | Ganzel | B60T 13/745 |
| | | | 303/66 |
| 2016/0009267 A1 * | 1/2016 | Lesinski, Jr. | B60T 7/12 |
| | | | 303/10 |
| 2016/0016571 A1 | 1/2016 | Ganzel | |
| 2016/0023644 A1 * | 1/2016 | Feigel | B60T 13/147 |
| | | | 303/3 |
| 2016/0152223 A1 * | 6/2016 | Bauer | B60T 7/042 |
| | | | 303/14 |
| 2016/0347298 A1 * | 12/2016 | Jung | B60T 13/745 |
| 2017/0217418 A1 | 8/2017 | Ganzel | |
| 2020/0298807 A1 * | 9/2020 | Ganzel | B60T 7/042 |
| 2020/0339096 A1 * | 10/2020 | Timm | B60T 7/042 |
| 2021/0061240 A1 * | 3/2021 | Zhang | B60T 13/146 |
| 2021/0155215 A1 * | 5/2021 | Ganzel | B60T 8/326 |

\* cited by examiner

VEHICLE BRAKE SYSTEM WITH SECONDARY BRAKE MODULE

CROSS-REFERENCE TO RELATED APPLICATIONS

This application claims the benefit of U.S. Provisional Application No. 62/630,519, filed Feb. 14, 2018, the disclosure of which is incorporated herein by reference.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster generates pressurized fluid for assisting in pressurizing the wheel brakes, thereby increasing the pressures generated by the master cylinder. Hydraulic boosters are commonly located adjacent the master cylinder and use a boost valve to help control the pressurized fluid.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

SUMMARY OF THE INVENTION

This invention relates to a brake system having a wheel brake and is operable under a non-failure normal braking mode and a manual push-through mode. The system includes a master cylinder operable by a brake pedal during a manual push-through mode to provide fluid flow at an output for actuating the wheel brake. A first source of pressurized fluid provides fluid pressure for actuating the wheel brake under a normal braking mode. A secondary brake module includes a plunger assembly for generating brake actuating pressure for actuating the wheel brake under the manual push-through mode.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
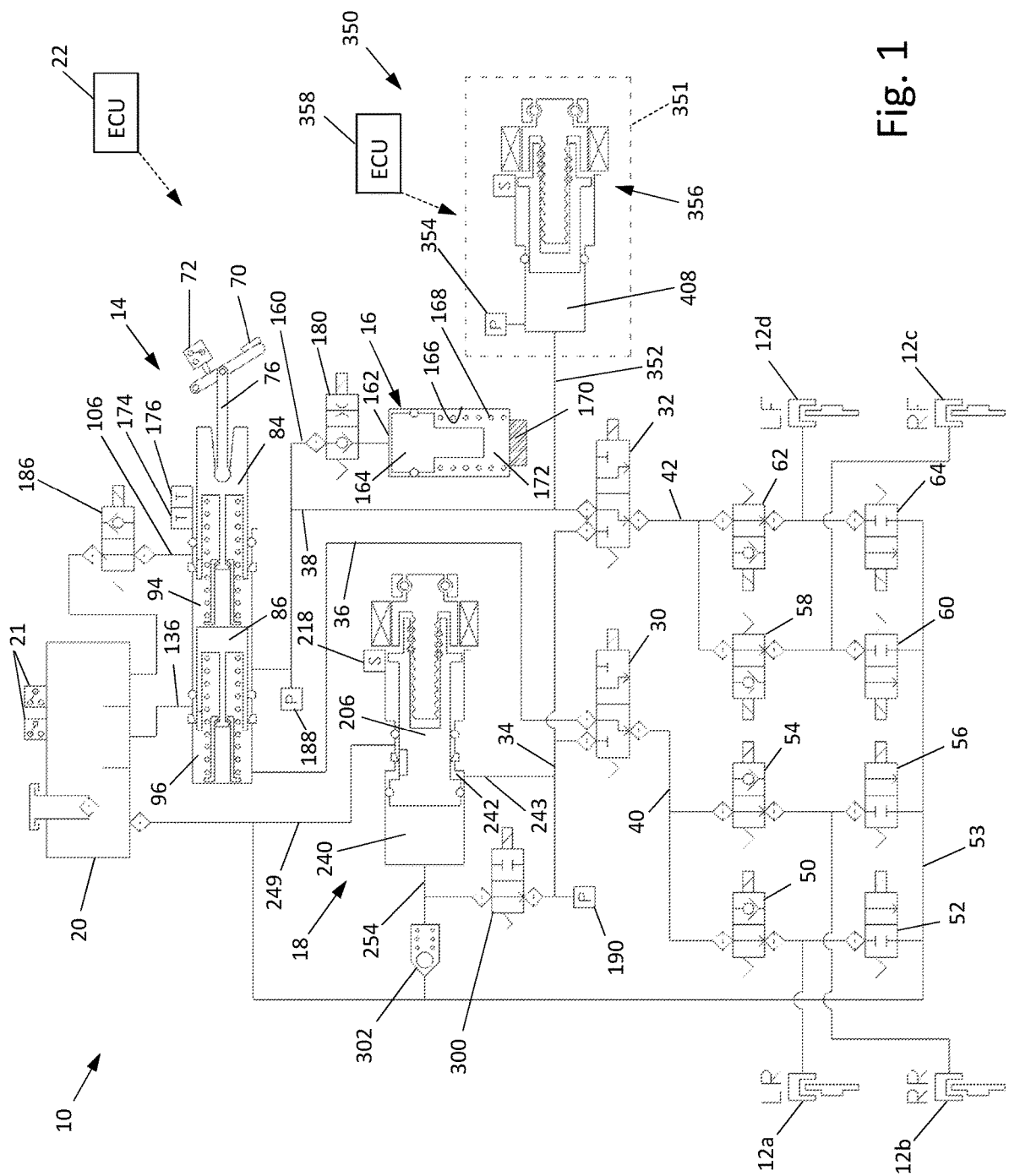
FIG. 1 is a schematic illustration of a brake system.

Referring now to the drawings, there is schematically illustrated in FIG. 1 a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12a, 12b, 12c, and 12d. The wheel brakes 12a, 12b, 12c, and 12d can have any suitable wheel brake structure operated by the application of pressurized brake fluid. The wheel brakes 12a, 12b, 12c, and 12d may include, for example, a brake caliper mounted on the vehicle to engage a frictional element (such as a brake disc) that rotates with a vehicle wheel to effect braking of the associated vehicle wheel. The wheel brakes 12a, 12b, 12c, and 12d can be associated with any combination of front and rear wheels of the vehicle in which the brake system 10 is installed. A vertically split brake system is illustrated such that the wheel brake 12a is associated with the left rear wheel, the wheel brake 12b is associated with the right rear wheel, the wheel brake 12c is associated with the right front wheel, and the wheel brake 12d is associated with the left front wheel. Alternatively, for a diagonally split system in which associated pairs of wheel brakes are on opposite corners of the vehicle, the wheel brake 12a may be associated with the left rear wheel, the wheel brake 12b may be associated with the right front wheel, the wheel brake 12c is associated with the left front wheel, and the wheel brake 12d is associated with the right rear wheel.

The brake system 10 includes a master cylinder, indicated generally at 14, a pedal simulator, indicated generally at 16, a plunger assembly, indicated generally at 18, and a reservoir 20. The reservoir 20 stores and holds hydraulic fluid for the brake system 10. The fluid within the reservoir 20 is preferably held at or about atmospheric pressure but may store the fluid at other pressures if so desired. The brake system 10 may include one or more fluid level sensors 21 for detecting the fluid level of the reservoir 20 or various tanks or compartments of the reservoir 20. The reservoir 20 may include multiple separate housings or compartmental walls formed within to provide separate fluid tank compartments.

As will be discussed in detail below, the plunger assembly 18 of the brake system 10 functions as a source of pressurized fluid to provide a desired pressure level to the wheel brakes 12a, 12b, 12c, and 12d during a typical or normal brake apply (non-failed system). Fluid from the wheel brakes 12a, 12b, 12c, and 12d may be returned to the plunger assembly 18 and/or diverted to the reservoir 20.

The brake system 10 also includes a main electronic control unit (ECU) 22. The main ECU 22 may include microprocessors. The main ECU 22 receives various signals, processes signals, and controls the operation of various electrical components of the brake system 10 in response to the received signals. The main ECU 22 can be connected to various sensors such as pressure sensors, travel sensors, switches, wheel speed sensors, and steering angle sensors. The main ECU 22 may also be connected to an external module (not shown) for receiving information related to yaw rate, lateral acceleration, longitudinal acceleration of the vehicle such as for controlling the brake system 10 during vehicle stability operation. Additionally, the main ECU 22 may be connected to the instrument cluster for collecting and supplying information related to warning indicators such as an ABS warning light, a brake fluid level warning light, and a traction control/vehicle stability control indicator light.

The brake system 10 further includes first and second isolation valves 30 and 32. The isolation valves 30 and 32 may be solenoid actuated three way valves. The isolation valves 30 and 32 are generally operable between two positions, as schematically shown in FIG. 1. The first and second isolation valves 30 and 32 each have a port in selective fluid communication with an output conduit 34 generally in communication with an output of the plunger assembly 18, as will be discussed below. The first and second isolation valves 30 and 32 also includes ports that are selectively in fluid communication with conduits 36 and 38, respectively, when the first and second isolation valves 30 and 32 are deenergized, as shown in FIG. 1. The first and second isolation valves 30 and 32 further include ports that are in fluid communication with conduits 40 and 42, respectively, which provide fluid to and from the wheel brakes 12a, 12b, 12c, and 12d.

In a preferred embodiment, the first and/or second isolation valves 30 and 32 may be mechanically designed such that flow is permitted to flow in the reverse direction (from conduit 34 to the conduits 36 and 38, respectively) when in their de-energized positions and can bypass the normally closed seat of the valves 30 and 32. Thus, although the 3-way valves 30 and 32 are not shown schematically to indicate this fluid flow position, it is noted that that the valve design may permit such fluid flow. This may be helpful in performing self-diagnostic tests of the brake system 10 such that fluid from the output of the plunger assembly 18 can be directed to the master cylinder 14.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the first isolation valve 30 to the wheel brake 12a, and for cooperatively relieving pressurized fluid from the wheel brake 12a to a reservoir conduit 53 in fluid communication with the reservoir 20. A second set of valves includes a second apply valve 54 and a second dump valve 56 in fluid communication with the conduit 40 for cooperatively supplying fluid received from the first isolation valve 30 to the wheel brake 12b, and for cooperatively relieving pressurized fluid from the wheel brake 12b to the reservoir conduit 53. A third set of valves includes a third apply valve 58 and a third dump valve 60 in fluid communication with the conduit 42 for cooperatively supplying fluid received from the second isolation valve 32 to the wheel brake 12c, and for cooperatively relieving pressurized fluid from the wheel brake 12c to the reservoir conduit 53. A fourth set of valves includes a fourth apply valve 62 and a fourth dump valve 64 in fluid communication with the conduit 42 for cooperatively supplying fluid received from the second isolation valve 32 to the wheel brake 12d, and for cooperatively relieving pressurized fluid from the wheel brake 12d to the reservoir conduit 53. Note that in a normal braking event, fluid flows through the deenergized open apply valves 50, 54, 58, and 62. Additionally, the dump valves 52, 56, 60, and 64 are preferably in their deenergized closed positions to prevent the flow of fluid to the reservoir 20.

The master cylinder 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, under certain failed conditions of the brake system 10, the master cylinder 14 may be used as a back-up source of pressurized fluid to essentially replace the normally supplied source of pressurized fluid from the plunger assembly 18. The master cylinder 14 can supply pressurized fluid in the conduits 36 and 38 (that are normally closed off at the first and second isolation valves 30 and 32 during a normal brake apply) to the wheel brake 12a, 12b, 12c, and 12d as required.

Figure 2:
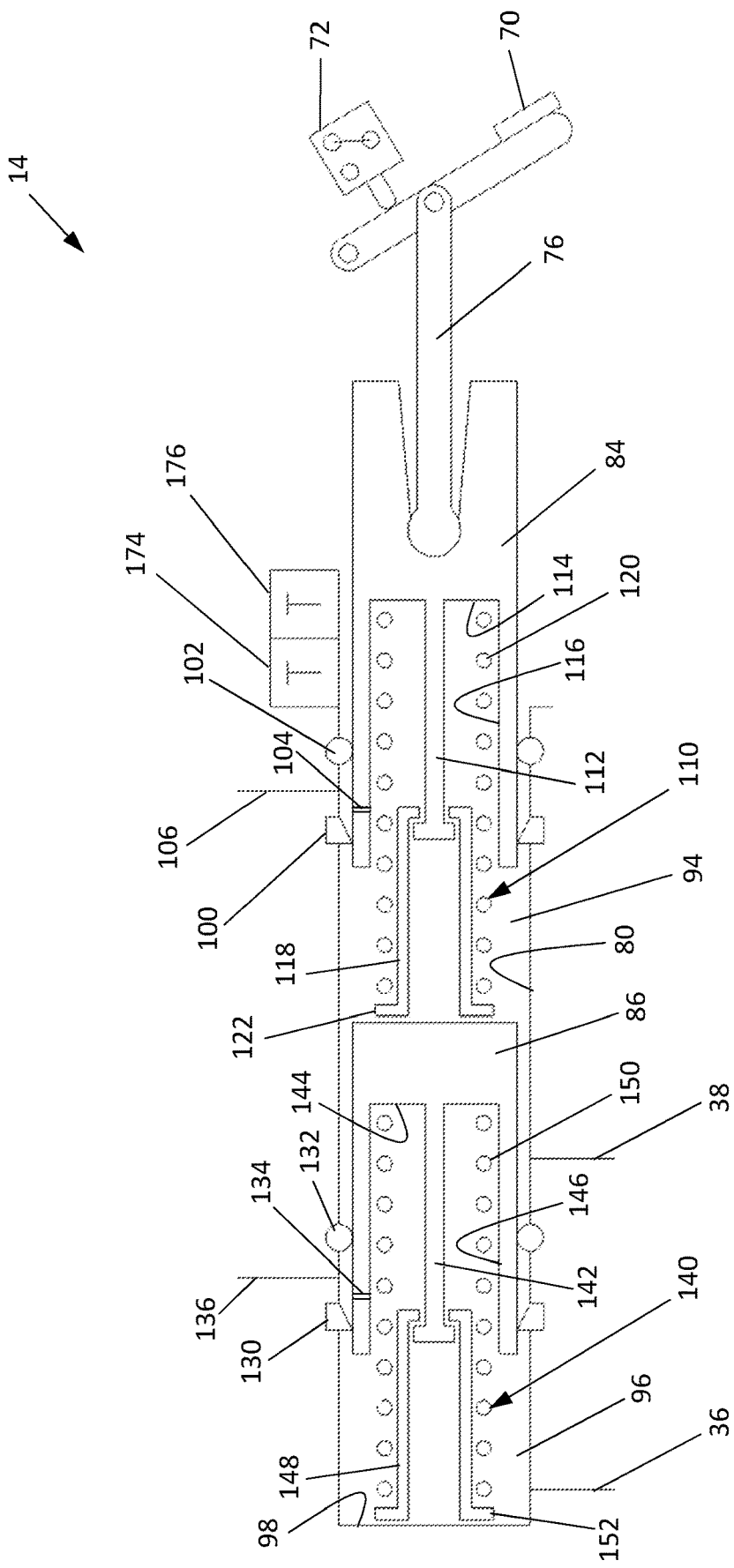
FIG. 2 is an enlarged schematic cross-sectional view of the master cylinder of the brake system of FIG. 1.

Referring now to the enlarged view of the master cylinder 14 in FIG. 2, the master cylinder 14 includes a housing having a bore 80 formed therein for slidably receiving various cylindrical pistons and other components therein. Note that the housing is not specifically schematically shown in FIGS. 1 and 2 but instead the walls of the bore 80 are illustrated. The housing may be formed as a single unit or include two or more separately formed portions coupled together. A primary piston 84 and a secondary piston 86 are slidably disposed within the bore 80. The primary piston 84 is connected with the brake pedal 70 via a linkage arm 76. Leftward movement of the primary piston 84 and the secondary piston 86 may cause, under certain conditions, a pressure increase within a primary chamber 94 and a secondary chamber 96, respectively, of the master cylinder 14. Various seals of the master cylinder 14 as well as the structure of the housing and the pistons 84 and 86 define the chambers 94 and 96. For example, the primary chamber 94 is generally defined between the primary piston 84 and the secondary piston 86. The secondary chamber 96 is generally defined between the secondary piston 86 and an end wall 98 of the housing formed by the bore 80.

As shown in FIG. 1, the primary chamber 94 of the master cylinder 14 is in fluid communication with the second isolation valve 32 via the conduit 38. Referring back to FIG. 2, an outer wall of the primary piston 84 is engaged with a lip seal 100 and a seal 102 mounted in grooves formed in the housing. One or more lateral passageways 104 are formed through a wall of the primary piston 84. The passageway 104 is located between the lip seal 100 and the seal 102 when the primary piston 84 is in its rest position, as shown in FIGS. 1 and 2. Note that in the rest position the lip seal 100 is just slightly to the left of the passageway 104, thereby permitting fluid communication between the primary chamber 94 and the reservoir 20 via a conduit 106. As will be discussed below, when the passageway 104 moves past the lip seal 100 such that it is to the left of the lip seal 100, fluid communication is cut off between the primary chamber 94 and the reservoir 20. Therefore, the cooperation between the passageway 104, the lip seal 100, and the conduit 106 function as a compensation port selectively permitting fluid communication between the primary chamber 94 and the reservoir 20.

The master cylinder 14 may include a primary spring arrangement, indicated generally at 110, disposed between the primary piston 84 and the secondary piston 86. The primary spring arrangement 110 positions the secondary piston 86 at a desired placement from the primary piston 84 when the master cylinder 14 is assembled. This positional relationship helps to define the volume of the primary chamber 94 in its at rest state or generally uncompressed condition. Additionally, the primary spring assembly 110 biases the primary and secondary pistons 84 and 86 away from each other when the primary spring assembly 110 is compressed. The primary spring arrangement 110 may have any suitable configuration, such as a caged spring assembly. For example, the primary spring assembly 110 may include a stem 112 attached to a bottom wall 114 of a bore 116 formed in the primary piston 84. The stem 112 engages with a tubular retainer 118 which is slidably mounted and captured on the stem 112. A coil spring 120 is disposed around the stem 112 and the retainer 118. One end of the coil spring 120 engages with the bottom wall 114 of the bore 116. The other end of the coil spring 120 engages with an outwardly extending flange 122 of the retainer 118.

As shown in FIG. 1, the secondary chamber 96 of the master cylinder 14 is in fluid communication with the first isolation valve 30 via the conduit 36. Referring back to FIG. 2, an outer wall of the secondary piston 86 is engaged with a lip seal 130 and a seal 132 mounted in grooves formed in the housing. One or more lateral passageways 134 are formed through a wall of the secondary piston 86. The passageway 134 is located between the lip seal 130 and the seal 132 when the secondary piston 86 is in its rest position, as shown in FIGS. 1 and 2. Note that in the rest position the lip seal 130 is just slightly to the left of the passageway 134, thereby permitting fluid communication between the secondary chamber 96 and the reservoir 20 via a conduit 136. As will be discussed below, when the passageway 134 moves past the lip seal 130 such that it is to the left of the lip seal 130, fluid communication is cut off between the secondary chamber 96 and the reservoir 20. Therefore, the cooperation between the passageway 134, the lip seal 130, and the conduit 136 function as a compensation port selectively permitting fluid communication between the primary chamber 94 and the reservoir 20.

The master cylinder 14 may include a secondary spring arrangement, indicated generally at 140, disposed between the secondary piston 86 and the end wall 98 of the housing of the master cylinder 14. The secondary spring arrangement 140 positions the secondary piston 86 at a desired placement relative to the end wall 98 when the master cylinder 14 is assembled. This positional relationship helps to define the volume of the secondary chamber 96 in its at rest state or generally uncompressed condition. Additionally, the secondary spring assembly 140 biases the secondary piston 86 in a rightward direction, as viewing FIG. 2, when the secondary spring assembly 140 is compressed. The secondary spring arrangement 140 may have any suitable configuration, such as a caged spring assembly. For example, the secondary spring assembly 140 may include a stem 142 attached to a bottom wall 144 of a bore 146 formed in the secondary piston 86. The stem 142 engages with a tubular retainer 148 which is slidably mounted and captured on the stem 142. A coil spring 150 is disposed around the stem 142 and the retainer 148. One end of the coil spring 150 engages with the bottom wall 144 of the bore 146. The other end of the coil spring 150 engages with an outwardly extending flange 152 of the retainer 148.

The primary chamber 94 of the master cylinder 14 is in selective fluid communication with the pedal simulator 16 via a conduit 160 which is in fluid communication with the conduit 38. As will be discussed below, leftward movement of the primary piston 84 caused by the driver depressing the brake pedal 70 will pressurize the primary chamber 94 causing fluid to flow into the pedal simulator 16 via the conduit 160. The pedal simulator 16 can be any suitable structure which provides a feedback force to the driver's foot via the brake pedal 70 when depressed. The pedal simulator 16 may include movable components which mimic the feedback force from a conventional vacuum assist hydraulic brake system. For example, as fluid is diverted into the pedal simulator 16, a simulation pressure chamber 162 defined within the pedal simulator 16 will expand causing movement of a piston 164 within the pedal simulator 16. The piston 164 is slidably disposed in a bore 166 formed in a housing of the pedal simulator 16. Movement of the piston 164 compresses a spring assembly, schematically represented as a spring 168. The compression of the spring 168 provides the feedback force to the driver of the vehicle. The spring 168 of the pedal simulator 16 can include any number and types of spring members as desired. For example, the spring 168 may include a combination of low rate and high rate spring elements to provide a non-linear force feedback. The pedal simulator 16 may also include an elastomeric pad 170 which engages with an end of the piston 164 when the piston 164 approaches its end of travel position, thereby providing a desired feedback force different from that provided solely by the spring 166. The spring 166 of the pedal simulator 16 may be housed within an air-filled chamber 172 vented to atmosphere. Alternatively, the spring 166 may be housed in a non-pressurized fluid chamber which may optionally be in fluid communication with the reservoir 20.

The brake system 10 further includes a solenoid actuated simulator valve 180 positioned within the conduit 160 between the primary chamber 94 of the master cylinder 14 and the pedal simulator 16. The simulator valve 180 selectively prevents the flow of fluid from the primary chamber 94 to the simulation chamber 162 of the pedal simulator 16, such as during a failed condition in which the master cylinder 14 is utilized to provide a source of pressurized fluid to the wheel brakes.

An optional check valve in parallel with an optional restricted orifice may be positioned with the conduit 160 or may be incorporated into the simulator valve 180, as illustrated in FIG. 1. The restricted orifice provides damping during a spike apply in which the driver depresses the brake pedal 70 rapidly and forcefully. This damping provides a force feedback making depression of the brake pedal 70 feel more like a traditional vacuum booster, which may be a desirable characteristic of the brake system 10. The damping may also provide a more accurate relationship between brake pedal travel and vehicle deceleration by generally avoiding too much brake pedal travel for the vehicle deceleration that can be delivered by the brake system 10. The check valve can provide an easy flow path and allows the brake pedal 70 to return quickly, which allows the associated brake pressure to decrease quickly per the driver's intent.

As discussed above, the primary chamber 94 of the master cylinder 14 is selectively in fluid communication with the reservoir 20 via a conduit 106 and the passageway 104 formed in the primary piston 84. The brake system 10 may include a simulator test valve 186 located within the conduit 106. The simulator test valve 186 may be electronically controlled between an open position, as shown in FIG. 1, and an energized closed position. The simulator test valve 186 is not necessarily needed during a normal boosted brake apply or for a manual push-through mode. The simulator test valve 186 can be energized to a closed position during various testing modes to determine the correct operation of other components of the brake system 10. For example, the simulator test valve 186 may be energized to a closed position to prevent venting to the reservoir 20 via the conduit 106 such that a pressure build up in the master cylinder 14 can be used to monitor fluid flow to determine whether leaks may be occurring through seals of various components of the brake system 10. As will be discussed below, the simulator test valve 186 may also be controlled by a secondary ECU separate from the main ECU 22.

The brake system 10 may further include a pressure sensor 188 in fluid communication with the conduit 38 to detect the pressure within the primary chamber 96 and for transmitting the signal indicative of the pressure to the main ECU 22. Alternatively or additionally, the brake system 10 may further include a pressure sensor (not shown) in fluid communication with the conduit 36 for transmitting a signal indicative of the pressure within the conduit 36. Sensing the pressure within the conduit 36 may be helpful during diagnostic tests to determine if the secondary piston 86 is moving properly within the master cylinder 14. Besides the added cost, a single pressure sensor 188 monitoring the pressure of the conduit 38, instead of the pressure within the conduit 36, may be desirable for providing a more accurate representation of the driver's intent. The brake system 10 may further include a pressure sensor 190 in fluid communication with the conduit 34 for transmitting a signal indicative of the pressure within the conduit 34 at the output of the plunger assembly 18 and for transmitting the signal indicative of the pressure to the main ECU 22.

Figure 3:
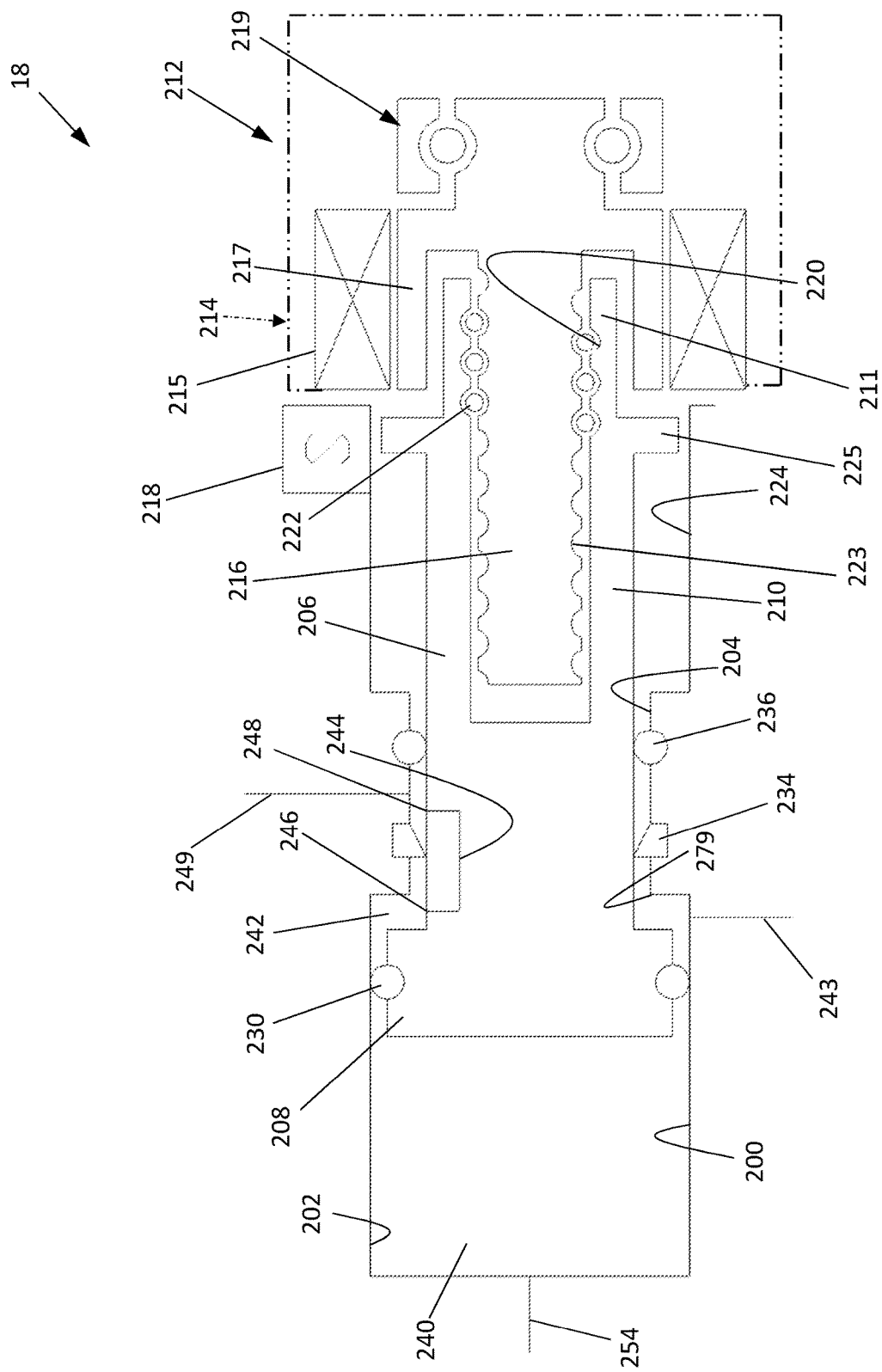
FIG. 3 is an enlarged schematic cross-sectional view of the plunger assembly of the brake system of FIG. 1.

As shown schematically in FIG. 3, the plunger assembly 18 includes a housing having a multi-stepped bore 200 formed therein. Note that the housing is not specifically schematically shown in FIGS. 1 and 3 but instead the walls of the bore 200 are illustrated. The bore 200 includes a first portion 202 and a second portion 204. A piston 206 is slidably disposed within the bore 200. The piston 206 includes an enlarged end portion 208 connected to a smaller diameter central portion 210. The piston 206 has a second end 211 connected to a ball screw mechanism, indicated generally at 212. The ball screw mechanism 212 is provided to impart translational or linear motion of the piston 206 along an axis defined by the bore 200 in both a forward direction (leftward as viewing FIGS. 1 and 3), and a rearward direction (rightward as viewing FIGS. 1 and 3) within the bore 200 of the housing.

In the embodiment shown, the ball screw mechanism 212 includes a motor, indicated schematically and generally at 214, which is electrically connected to the main ECU 22 for actuation thereof. The motor 214 rotatably drives a screw shaft 216. The motor 214 generally includes a stator 215 and a rotor 217. In the schematic embodiment shown in FIG. 3, the rotor 217 and the screw shaft 216 are integrally formed together. However, it should be understood that they can be formed from separate parts fixedly connected together. The rotor 217 and the screw shaft 216 are rotatably mounted to the housing of the plunger assembly 18 by a bearing assembly, indicated generally at 219. The second end 211 of the piston 206 includes a threaded bore 220 and functions as a driven nut of the ball screw mechanism 212. The ball screw mechanism 212 includes a plurality of balls 222 that are retained within helical raceways 223 formed in the screw shaft 216 and the threaded bore 220 of the piston 206 to reduce friction. Although a ball screw mechanism 212 is shown and described with respect to the plunger assembly 18, it should be understood that other suitable mechanical linear actuators may be used for imparting movement of the piston 206. It should also be understood that although the piston 206 functions as the nut of the ball screw mechanism 212, the piston 206 could be configured to function as a screw shaft of the ball screw mechanism 212.

The piston 206 may include structures engaged with cooperating structures formed in the housing of the plunger assembly 18 to prevent rotation of the piston 206 as the screw shaft 216 rotates relative to the piston 206. For example, the piston 206 may include outwardly extending splines or tabs or splines 225 disposed within longitudinal grooves 224 formed in the housing. The splines 225 slide along within the grooves 224 as the piston 206 travels in the bore 200.

As will be discussed below, the plunger assembly 18 is preferably configured to provide pressure to the conduit 34 when the piston 206 is moved in both the forward and rearward directions. The plunger assembly 18 includes a seal 230 mounted on the enlarged end portion 208 of the piston 206. The seal 230 slidably engages with the inner cylindrical surface of the first portion 202 of the bore 200 as the piston 206 moves within the bore 200. A seal 234 and a seal 236 are mounted in grooves formed in the second portion 204 of the bore 200. The seals 234 and 236 slidably engage with the outer cylindrical surface of the central portion 210 of the piston 206. A first pressure chamber 240 is generally defined by the first portion 202 of the bore 200, the enlarged end portion 208 of the piston 206, and the seal 230. An annular shaped second pressure chamber 242, located generally behind the enlarged end portion 208 of the piston 206, is generally defined by the first and second portions 202 and 204 of the bore 200, the seals 230 and 234, and the central portion 210 of the piston 206. The seals 230, 234, and 236 can have any suitable seal structure.

Although the plunger assembly 18 may be configured to any suitable size and arrangement, in one embodiment, the effective hydraulic area of the first pressure chamber 240 is greater than the effective hydraulic area of the annular shaped second pressure chamber 242. The first pressure chamber 240 generally has an effective hydraulic area corresponding to the diameter of the central portion 210 of the piston 206 (the inner diameter of the seal 234) since fluid is diverted through the conduits 254, 34, and 243 as the piston 206 is advanced in the forward direction. The second pressure chamber 242 generally has an effective hydraulic area corresponding to the diameter of the first portion 202 of the bore 200 minus the diameter of the central portion 210 of the piston 206. If desired, the plunger assembly 18 could be configured to provide that on the back stroke in which the piston 206 is moving rearwardly, less torque (or power) is required by the motor 214 to maintain the same pressure as in its forward stroke. Besides using less power, the motor 214 may also generate less heat during the rearward stroke of piston 206. Under circumstances in which the driver presses on the pedal 70 for long durations, the plunger assembly 18 could be operated to apply a rearward stroke of the piston 206 to prevent overheating of the motor 214. Of course, it may also be desirable to configure the plunger assembly 18 such that the behavior of the rearward stroke is the same or similar to the forward stroke of the plunger assembly 18.

The plunger assembly 18 preferably includes a sensor, schematically shown as 218, for indirectly detecting the position of the piston 206 within the bore 200. The sensor 218 is in communication with the main ECU 22. In one embodiment, the sensor 218 detects the rotational position of the rotor 217 which may have metallic or magnetic elements embedded therein. Since the rotor 217 is schematically shown as being integrally formed with the shaft 216, the rotational position of the shaft 216 corresponds to the linear position of the piston 206. Thus, the position of the piston 206 can be determined by sensing the rotational position of the rotor 217 via the sensor 218. Note that due to ease of manufacturing, the rotor 217 may not be integrally formed with the shaft 216 but rather may be a separate part connected to the shaft 216.

As best shown in FIG. 3, the piston 206 of the plunger assembly 18 includes a passageway 244 formed therein. The passageway 244 defines a first port 246 extending through the outer cylindrical wall of the piston 206 and is in fluid communication with the secondary chamber 242. The passageway 244 also defines a second port 248 extending through the outer cylindrical wall of the piston 206 and is in fluid communication with a portion of the bore 200 located between the seals 234 and 236. The second port 248 is in fluid communication with a conduit 249 which is in fluid communication with the reservoir 20. When in the rest position, as shown in FIG. 3, the pressure chambers 240 and 242 are in fluid communication with the reservoir 20 via the conduit 249. This helps in ensuring a proper release of pressure at the output of the plunger assembly 18 and within the pressure chambers 240 and 242 themselves. After an initial forward movement of the piston 206 from its rest position, the port 248 will move past the lip seal 234, thereby closing off fluid communication of the pressure chambers 240 and 242 from the reservoir 20, thereby permitting the pressure chambers 240 and 242 to build up pressure as the piston 206 moves further.

Referring back to FIG. 1, the brake system 10 further includes a normally open solenoid actuated plunger valve 300. The plunger valve 300 is in fluid communication with the first pressure chamber 240 of the plunger assembly 18 via a conduit 254. The plunger valve 300 is also in fluid communication with the output conduit 34 of the plunger assembly 18. A check valve 302 is disposed between the conduit 254 and the reservoir 20 via the conduit 53. Generally, the plunger valve 300 is controlled to permit fluid flow at the outputs of the plunger assembly 18 and to permit venting to the reservoir 20 through the plunger assembly 18 when so desired. For example, the plunger valve 300 may be deenergized to its open position during a normal braking event and the plunger assembly 18 is operated in its forward pressure stroke. When the driver releases the brake pedal 70, the plunger valve 300 preferably remains in its open position. As will be explained in further detail below, the plunger assembly 18 can be operated to provide pressure to the conduit 34 from the second pressure chamber 242 in a rearward (rightward as viewing FIGS. 1 and 3) stroke of the piston 206 as well.

Instead of using a single plunger valve 300, the brake system 10 could be configured to utilize a pair of solenoid actuated plunger valves (not shown) located at the output of the plunger assembly 18. For example, a first plunger valve may be a normally closed valve and a second plunger valve may be a normally open valve such that both valves are controlled to their open positions during a forward stroke of the piston 206. The first and second plunger valves can be operated to their closed positions during a rearward stroke of the piston 206. The first plunger valve may have a relatively large orifice when in its open position to provide an easy flow path therethrough. The second plunger valve may be provided with a much smaller orifice in its open position as compared to the first plunger valve. One reason for this is to help prevent the piston 206 of the plunger assembly 18 from rapidly being back driven upon a failed event due to the rushing of fluid through the conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 18 upon failure of the brake system 10, such as for example, when power is lost to the motor 214 and the pressure within the conduit 34 is relatively high.

The plunger assembly 18 may include an optional spring member, such as a spring washer (not shown), to assist in cushioning such a rapid rearward back drive of the piston 206. The spring washer may also assist in cushioning the piston 206 moving at any such speed as it approaches a rest position near its most retracted position within the bore 200. For example, the spring washer may be located between the enlarged end portion 208 and a shoulder 279 formed in the bore 200 between the first and second portions 202 and 204. The spring washer can have any suitable configuration which deflects or compresses upon contact with the piston 206 as the piston 206 moves rearwardly. For example, the spring washer may be in the form of a metal conical spring washer. Alternatively, the spring washer may be in the form of a wave spring.

Referring to FIG. 1, the brake system 10 further includes a secondary brake module, indicated generally at 350. The secondary brake module 350 functions as a second source of pressurized fluid, such as under certain failed conditions of the brake system 10, as will be explained below. The secondary brake module unit 350 may be housed in a different unit or housing block, indicated schematically at 351, located remotely from the remainder of the brake system 10. Alternatively, the housing block 351 may be integrally formed with or connected to the housing containing components of the brake system 10. If housed separately, it is noted that the secondary brake module 350 need only include a single fluid conduit 352 connecting it to the remainder of the brake system 10. The conduit 352 is in fluid communication with the conduit 38 and the primary chamber 94. This single line or conduit 352 has a great advantage over other systems having secondary sources of pressurized fluid that might require multiple lines connecting them. Not only do the additional lines add extra cost to the system 10, but add complexity to the design of the hydraulic block containing the various components of the brake system 10. The block must be larger to accommodate the additional pathways but must also accommodate necessary wrench clearance or spacing allowances.

The secondary brake module 350 includes a pressure sensor 354 and a secondary plunger assembly, indicated generally at 356. The pressure sensor 354 senses the pressure at the output of the secondary plunger assembly 356 and, therefore, the pressure within the conduit 352. The secondary brake module 350 preferably further includes a secondary ECU 358 for controlling the secondary brake module 350. The secondary ECU 358 also receives information from the pressure sensor 354 to assist in controlling the secondary brake module 350. The secondary ECU 358 may include microprocessors and function in a similar manner as the main ECU 22. In a preferred embodiment, the secondary ECU 358 is separate from the main ECU 22 in both location and in electrical power connection. As will be explained below, even if the main ECU 22 fails or loses power, the secondary ECU 358 can be operated to control the secondary brake module 350 to provide pressurized fluid to the failed brake system 10. In a preferred embodiment, the secondary ECU 358 is also capable of controlling the simulator test valve 186 to selectively prevent the flow of fluid through the master cylinder 14 into the reservoir 20, the reason for which will be explained further below.

The main ECU 22 and the secondary ECU 358 may both be connected to a vehicle CAN bus (Controller Area Network bus) for receiving various signals and controls. Both the main ECU 22 and the secondary ECU 358 may send out signals over the CAN bus indicating that they are operating properly. These signals may be received by the other of the ECU 22 and 358. For example, once the secondary ECU 358 does not receive the signal from the main ECU 22 over the CAN bus of proper operation of the main ECU 22 and/or the brake system 10, the secondary 358 may begin operating the secondary brake module 350, as will be described below.

The ECU 358 may optionally even function as a fail-safe back up in case the main ECU 22 fails. It should be understood that the brake system 10 could be configured such that the main ECU 22 also controls the secondary brake module 350. Alternatively, the secondary ECU 358 may be eliminated such that the main ECU 22 controls the entire brake system 10 including the secondary brake module 350.

Although the secondary brake module 350 could be configured with any suitable source of pressurized fluid, the preferred embodiment utilizes a plunger assembly, such as the secondary plunger assembly 356. The secondary plunger assembly 356 may have any suitable design that is sufficient to supply a controllable amount of pressurized fluid to the brake system 10 typically under certain failed system conditions, as will be explained further below. It is noted that the secondary plunger assembly 356 may be of a less expensive or rugged design compared to the plunger assembly 18 due to the reduced operating requirements of the secondary plunger assembly 356 compared to the plunger assembly 18. As will be explained below, the secondary plunger assembly 356 need only be used during certain failed conditions of the brake system 10. This is compared to the continuous operation of the plunger assembly 18 during the life of the brake system 10.

Figure 4:
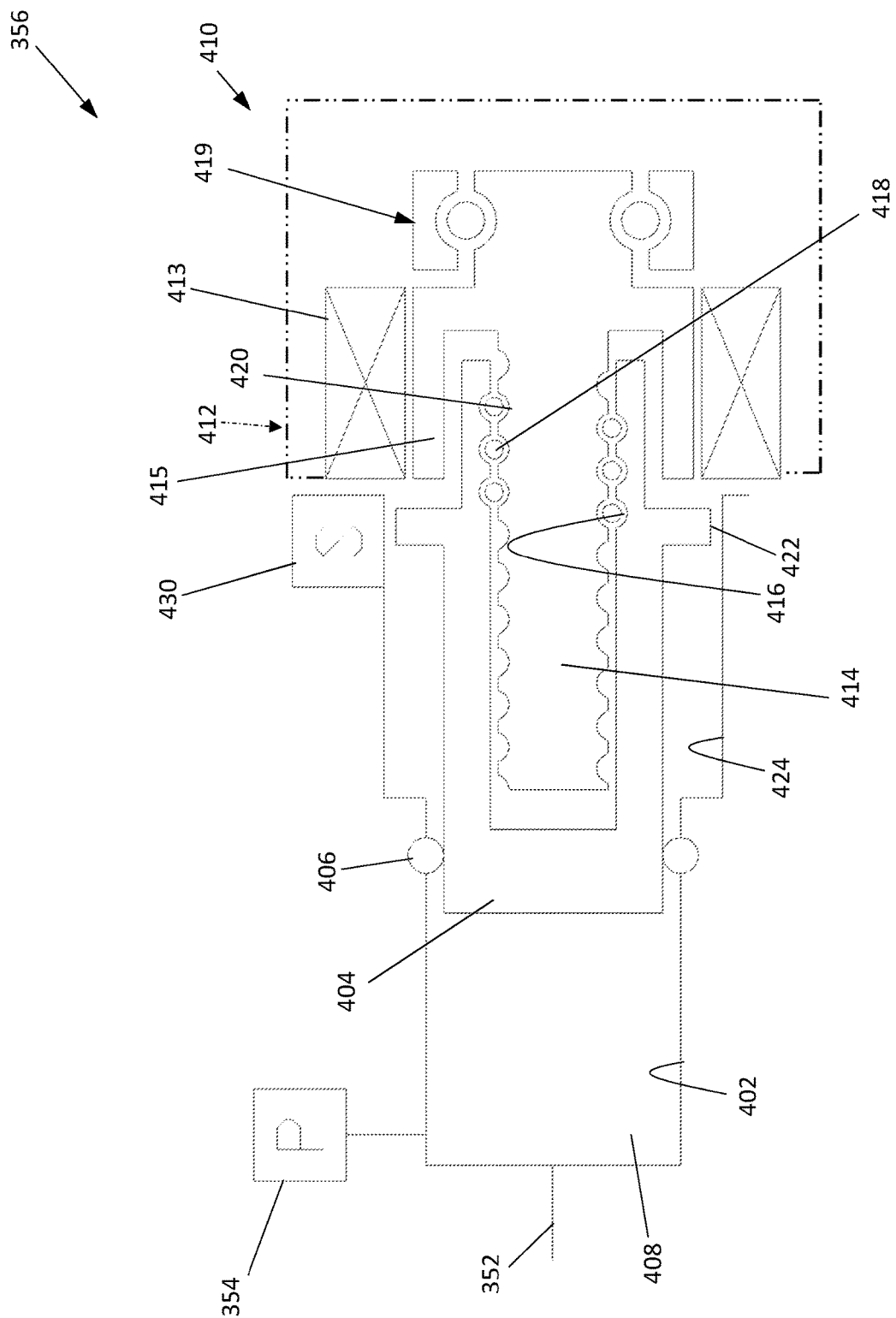
FIG. 4 is an enlarged schematic cross-sectional view of the plunger assembly of the secondary brake module of FIG. 3.

In the embodiment schematically illustrated in FIG. 4, the secondary plunger assembly 356 includes a housing having a bore 402 formed therein. Note that the housing is not specifically schematically shown in FIGS. 1 and 4 but instead the walls of the bore 402 are illustrated. A piston 404 is slidably disposed within the bore 402. A seal 406, the piston 404, and a portion of the bore 402 define a pressure chamber 408 for the secondary plunger assembly 356. The conduit 352 is in fluid communication with the pressure chamber 408. A linear actuator, such as a ball screw mechanism, indicated generally at 410, is connected to the piston 404 to impart translational or linear motion of the piston 404 along an axis defined by the bore 402 in both a forward (leftward) and rearward (rightward) direction within the bore 402.

In the embodiment shown in FIG. 4, the ball screw mechanism 410 includes a motor, indicated schematically and generally at 412, which is electrically connected to the secondary ECU 358 for actuation thereof. The motor 412 is preferably brushless and rotatably drives a screw shaft 414. The motor 412 generally includes a stator 413 and a rotor 415. In the schematic embodiment shown in FIG. 4, the rotor 415 and the screw shaft 414 are integrally formed together but may be formed from separate parts connected together. The rotor 415 and the screw shaft 414 are rotatably mounted to the housing of the plunger assembly 356 by a bearing assembly, indicated generally at 419. The piston 404 includes a threaded bore 416 and functions as a driven nut of the ball screw mechanism 410. The ball screw mechanism 410 includes a plurality of balls 418 that are retained within helical raceways 420 formed in the screw shaft 414 and the threaded bore 416 of the piston 404 to reduce friction. Although a ball screw mechanism 410 is shown and described with respect to the plunger assembly 18, it should be understood that other suitable mechanical linear actuators may be used for imparting movement of the piston 404. It should also be understood that although the piston 404 functions as the nut of the ball screw mechanism 410, the piston 404 could be configured to function as a screw shaft of the ball screw mechanism 410.

The piston 404 may include structures engaged with cooperating structures formed in the housing of the secondary plunger assembly 356 to prevent rotation of the piston 404 as the screw shaft 414 rotates relative to the piston 404. For example, the piston 404 may include outwardly extending splines or tabs or splines 422 disposed within longitudinal grooves 424 formed in the housing. The splines 422 slide along within the grooves 424 as the piston 404 travels in the bore 402.

The secondary plunger assembly 356 may include a sensor, schematically shown as 430, for indirectly detecting the position of the piston 404 within the bore 402. The sensor 430 is in communication with the secondary ECU 358. In one embodiment, the sensor 430 detects the rotational position of the rotor 415 which may have metallic or magnetic elements embedded therein. The rotational position of the shaft 414 corresponds to the linear position of the piston 404. Thus, the position of the piston 404 can be determined by sensing the rotational position of the rotor 415 via the sensor 430.

Referring to FIG. 1, in a preferred embodiment of the brake system 10, the master cylinder 14 includes a first travel sensor 174 and a second travel sensor 176. The first travel sensor 174 produces signals transmitted to the main ECU 22 that are indicative of the length of travel of the primary piston 84 of the master cylinder 14. Similarly, the second travel sensor 176 may also produce signals transmitted to the main ECU 22 that are indicative of the length of travel of the primary piston 84 of the master cylinder 14 which provides for redundancy in case the first travel sensor 174 fails. In a preferred embodiment, the second travel sensor 176 is at least connected to the secondary ECU 358 for transmitting signals to the secondary ECU 358 that are indicative of the length of travel of the primary piston 84 of the master cylinder 14 which are in turn indicative of the driver's intent. Under certain failed conditions as will be discussed below, the secondary ECU 358 can control the secondary brake module 350 in accordance with the driver's intent via signals from the travel sensor 176. Of course, the secondary ECU 358 may also be in communication with the first travel sensor 174 as well.

The operation of the brake system 10 will now be described. During normal braking operations, the plunger assembly 18 is operated to provide pressure to the conduit 34 for actuation of the wheel brakes 12a, 12b, 12c, and 12d. Under certain driving conditions, the main ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the master cylinder 14, generated by depression of the brake pedal 70, is generally diverted into the pedal simulator 16. The simulator valve 180 is energized to its open position to divert fluid through the simulator valve 180 from the primary chamber 94. Also note that fluid flow from the primary chamber 94 to the reservoir 20 is closed off once the passageway 104 in the primary piston 84 moves past the seal 100.

During the duration of a normal braking event, the simulator valve 180 remains open, preferably. Also, during the normal braking operation, the isolation valves 30 and 32 are energized to secondary positions to prevent the flow of fluid from the conduits 36 and 38 through the isolation valves 30 and 32, respectively. Preferably, the isolation valves 30 and 32 are energized throughout the duration of an ignition cycle such as when the engine is running instead of being energized on and off to help minimize noise. Note that initial movement of the primary and secondary pistons 84 and 86 caused by the depression of the brake pedal 70 causes the primary and secondary pistons 84 and 86 to move such that the passageways 136 and 144 move past the seals 100 and 130, respectively, thereby preventing fluid communication between the reservoir 20 and the primary and secondary chambers 94 and 96, respectively. Prevention of fluid flow through the isolation valves 30 and 32 hydraulically locks the primary and secondary chambers 94 and 96 of the master cylinder 14 preventing further movement of the primary and secondary pistons 84 and 86.

It is generally desirable to maintain the isolation valves 30 and 32 energized during the normal braking mode to ensure venting of fluid to the reservoir 20 through the plunger assembly 18 such as during a release of the brake pedal 70 by the driver. As best shown in FIG. 3, the passageway 244 formed in the piston 206 of the plunger assembly 18 permits this ventilation.

During normal braking operations, while the pedal simulator 16 is being actuated by depression of the brake pedal 70, the plunger assembly 18 can be actuated by the main ECU 22 to provide actuation of the wheel brakes 12a, 12b, 12c, and 12d. The plunger assembly 18 is operated to provide desired pressure levels to the wheel brakes 12a, 12b, 12c, and 12d compared to the pressure generated by the master cylinder 14 by the driver depressing the brake pedal 70. The main ECU 22 can control the plunger assembly 18 based on the driver's intentions based on information obtained by the travel sensor 174 and/or the pressure sensor 188.

The main ECU 22 actuates the motor 214 to rotate the screw shaft 216 in the first rotational direction. Rotation of the screw shaft 216 in the first rotational direction causes the piston 206 to advance in the forward direction (leftward as viewing FIGS. 1 and 3). Movement of the piston 206 causes a pressure increase in the first pressure chamber 240 and fluid to flow out of the first pressure chamber 240 and into the conduit 254. Fluid can flow into the conduit 34 via the open plunger valve 300. Note that fluid is permitted to flow into the second pressure chamber 242 via a conduit 243 as the piston 206 advances in the forward direction. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through open apply valves 50, 54, 58, and 62 while the dump valves 52, 56, 60, and 64 remain closed.

When the driver lifts off or releases the brake pedal 70, the main ECU 22 can operate the motor 214 to rotate the screw shaft 216 in the second rotational direction causing the piston 206 to retract withdrawing the fluid from the wheel brakes 12a, 12b, 12c, and 12d. The speed and distance of the retraction of the piston 206 is based on the demands of the driver releasing the brake pedal 70 as sensed by the travel sensor 174 and/or the pressure sensor 188. The main ECU 22 controls the plunger assembly 18 accordingly with feedback from the sensor 218 indirectly sensing the position of the piston 206 of the plunger assembly 18. Under certain conditions, the pressurized fluid from the wheel brakes 12a, 12b, 12c, and 12d may assist in back-driving the ball screw mechanism 212 moving the piston 206 back towards its rest position.

During a braking event, the main ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the main ECU 22 can operate the plunger assembly 18 to provide a source of pressurized fluid directed to the wheel brakes, such as during an autonomous vehicle braking event.

In some situations, the piston 206 of the plunger assembly 18 may reach its full stroke length within the bore 200 of the housing and additional boosted pressure is still desired to be delivered to the wheel brakes 12a, 12b, 12c, and 12d. The plunger assembly 18 is a dual acting plunger assembly such that it is configured to also provide boosted pressure to the conduit 34 when the piston 206 is stroked rearwardly (rightward) or in a reverse direction. This has the advantage over a conventional plunger assembly that first requires its piston to be brought back a certain amount before it can again advance the piston to create pressure within a single pressure chamber.

If the piston 206 has reached its full stroke, for example, and additional boosted pressure is still desired, the plunger valve 300 is energized to its closed position. The main ECU 22 actuates the motor 214 in a second rotational direction opposite the first rotational direction to rotate the screw shaft 216 in the second rotational direction. Rotation of the screw shaft 216 in the second rotational direction causes the piston 206 to retract or move in the rearward direction (rightward as viewing FIGS. 1 and 3). Movement of the piston 206 causes a pressure increase in the second pressure chamber 242 and fluid to flow out of the second pressure chamber 242 and into the conduit 243 and the conduit 34. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through the opened apply valves 50, 54, 58, and 62 while dump valves 52, 56, 60, and 64 remain closed.

In a similar manner as during a forward stroke of the piston 206, the main ECU 22 can also selectively actuate the apply valves 50, 54, 58, and 62 and the dump valves 52, 56, 60, and 64 to provide a desired pressure level to the wheel brakes 12a, 12b, 12c, and 12d, respectively. When the driver lifts off or releases the brake pedal 70 during a pressurized rearward stroke of the plunger assembly 18, the plunger valve 300 is preferably operated to its open position. Note that when transitioning out of a slip control event, the ideal situation would be to have the position of the piston 206 and the displaced volume within the plunger assembly 18 correlate exactly with the given pressures and fluid volumes within the wheel brakes 12a, 12b, 12c, and 12d. However, when the correlation is not exact, such as for example, when there is excess fluid within the plunger assembly 18, fluid can escape via the passageway 244 to the reservoir 20. In situations where there is a deficiency of fluid, fluid can be drawn from the reservoir 20 via the check valve 302 into the chamber 240 of the plunger assembly 18.

In the event of a loss of electrical power to portions of the brake system 10, the brake system 10 provides for manual push-through or manual apply such that the master cylinder 14 can supply relatively high pressure fluid to the conduits 36 and 38. During an electrical failure or failure of the main ECU 22, the motor 214 of the plunger assembly 18 might cease to operate, thereby failing to produce pressurized hydraulic brake fluid from the plunger assembly 18. The isolation valves 30 and 32 will shuttle (or remain) in their positions to permit fluid flow from the conduits 36 and 38 to the wheel brakes 12a, 12b, 12c, and 12d. The simulator valve 180 is shuttled to its deenergized closed position to prevent fluid from flowing out of the primary chamber 94 to the pedal simulator 16. During the manual push-through apply, the primary piston 84 and the secondary piston 86 will advance leftwardly such that the passageways 104 and 134 will move past the seals 100 and 130, respectively, to prevent fluid flow from their respective primary and secondary chambers 94 and 96 to the reservoir 20, thereby pressurizing the primary and secondary chambers 94 and 96. Fluid flows from the primary and secondary chambers 94 and 96 into the conduits 38 and 36, respectively, to actuate the wheel brakes 12a, 12b, 12c, and 12d.

The brake system 10 is ideally suited for vehicles, such as trucks, that have wheel brakes requiring a relatively high volume of fluid for full operation thereof. Thus, these vehicles may demand a brake system capable of providing a relatively large volume of fluid to the wheel brakes compared to brake systems designed for smaller passenger vehicles. This may be especially true in a failed condition when the brake system is undergoing a manual push-through operation. The brake system 10 can provide an increased volume of fluid for the front and rear circuits via the secondary brake module 350. For example, if an electrical failure occurred in the brake system 10, the secondary brake module 350 may be operated to provide an extra boost function to the front and rear wheel brakes. The secondary unit 350 may be located remotely and/or electrically disconnected therefrom for such a reason.

The operation of the secondary brake module 350 will now be explained relative to the brake system 10 undergoing a manual push-through event. If a failed condition occurred prior to the driver applying the brakes (pushing on the brake pedal), when the driver pushes on the brake pedal 70, fluid from the primary and secondary chambers 94 and 96 of the master cylinder 14 will be diverted through the deenergized isolation valves 30 and 32. The rear wheel brakes 12a and 12b will receive pressurized fluid from the secondary chamber 96 of the master cylinder 14. Similarly, the front wheel brakes 12c and 12d will receive pressurized fluid from the primary chamber 94 of the master cylinder 14.

For larger vehicles with wheel brakes having a relatively large volume of fluid, the driver would normally have to press the brake pedal 70 a relatively long distance during a manual push-through event. To assist the driver, the secondary unit 350 may be operated by the secondary ECU 358 (or possibly the main ECU 22) to engage the secondary plunger assembly 356. The secondary plunger assembly 356 is actuated such that the ball screw mechanism 410 advances the piston 404 in a forward direction pressurizing the pressure chamber 408. Pressurized fluid flows from the chamber 240 into the conduit 352 and into the front circuit conduit 38, thereby providing a pressure increase for the front circuit (via the conduit 38). A greater pressure level from the secondary plunger assembly 356 causes a pressure increase in the primary chamber 94 of the master cylinder 14, which advances the secondary piston 86, thereby causing an increase in pressure within the secondary chamber 96 of the master cylinder 14. The increase of pressure within the secondary chamber 94 causes a pressure increase in the rear circuit via the conduit 36. Thus, actuation of the secondary plunger assembly 356 increases pressure and fluid flow into the front and rear circuits via the conduits 38 and 36. Thus, the driver will apply a shortened pedal travel length compared to what the driver would normally have to apply during a manual push-through event without the assistance of the secondary plunger assembly 356.

To control the secondary plunger assembly 356, the secondary ECU 358 may use sensor information from the pressure sensor 354 to help in determining the driver's demands as the driver pushes on the brake pedal 70 energizing the primary chamber 94 of the master cylinder 14. Note that information from the pressure sensor 188 may not be available in electrical power is down for the main brake system 10. Thus, the addition of a separate pressure sensor 354 is preferred. Preferably, the secondary ECU 358 has knowledge from the main ECU 22 regarding the P-V (pressure-volume) characteristics of the wheel brakes and various components of the brake system 10. For example, it may be known that for any given desired pressure level at the front and rear circuit conduits 38 and 36 that a given volume of fluid is required to meet that demand. Obviously, this requirement will need to be compensated relative to the rate of apply. The secondary ECU 358 can base its control of the secondary plunger assembly 356 based on this previous knowledge along with the current pressure increase applied by the driver acting on the brake pedal 70. The driver inducing pressure increase can be determined by the readings from the pressure sensor 354 which correspond to the pressure increase by the output of the master cylinder 14.

As the driver releases the brake pedal 70 to end the manual push-through braking event, fluid can be diverted back into the pressure chamber 408 of the secondary plunger assembly 356 by controlling the secondary plunger assembly 356 in a retracting mode moving the piston 404 rearwardly.

It is noted that the secondary brake module 350 is connected to the front circuit via the conduits 352 and 38, and not directly connected to the rear circuit via the conduit 36. Even if the secondary piston 86 were to bottom out (advance far leftward) due to a failure in the master cylinder 14, during a manual push-through event a further increase in pressure provided by the secondary plunger assembly 356 will still permit an increase in pressure within the front circuit via the conduit 38. This has an advantage of not inadvertently rear biasing the braking event (undesirable compared to front biasing), wherein if the secondary brake module 350 were directly connected to the rear circuit and pistons of the master cylinder 14 bottomed out, a further pressure increase by the secondary plunger assembly 356 would only increase pressure within the rear circuit and not the front circuit.

Although the brake system 10 was described above relative to a vertical split system (wherein the conduit 38 supplies fluid to the front wheel brakes 12c and 12d, and the conduit 36 supplies fluid the rear wheel brakes 12a and 12b), the brake system 10 could be configured as a diagonally split system. In this scenario, the wheel brake 12a may be associated with the right front wheel brake. The wheel brake 12b is associated with the left rear wheel brake. The wheel brake 12c is associated with the right rear wheel brake. The wheel brake 12d is associated with the left front wheel brake. In this case, even if the secondary piston 86 where to bottom out, pressure can still be increased to one front brake and one rear brake (left front and right rear) via the conduit 38. Alternatively, if one circuit is determined to have a fluid leak and fluid pressure increases are prevented in this circuit, the other circuit could still be energized with pressurized fluid, thus providing one front wheel and one rear wheel to still be operational.

Another advantage of the secondary brake module 350 is that it may be operated even if the driver is not depressing on the brake pedal 70, and thus, no pressure can be generated from the master cylinder 14. For example, the secondary brake module 350 may be engaged due to a failed event of the brake system 10 during an autonomous driving/braking event. During a normal autonomous driving/braking event, the plunger assembly 18 can be operated to provide the desired braking control to the wheel brakes 12a, 12b, 12c, 12d. However, if the main braking system 10 fails, such as an electrical power cut-off to the brake system 10 such that the plunger assembly 18 cannot be operated, the secondary ECU 358 can engage the secondary plunger assembly 356 to provide pressure to the front and rear circuits via the conduits 352, 38, and 36. The secondary ECU 358 operates the simulator test valve 186 to an energized closed position to prevent the flow of fluid through the now open compensation ports (passageways 104 and 134 moving past seals 100 and 134) and the conduits 106 and 136 of the master cylinder 14 to the reservoir 20.

Figure 5:
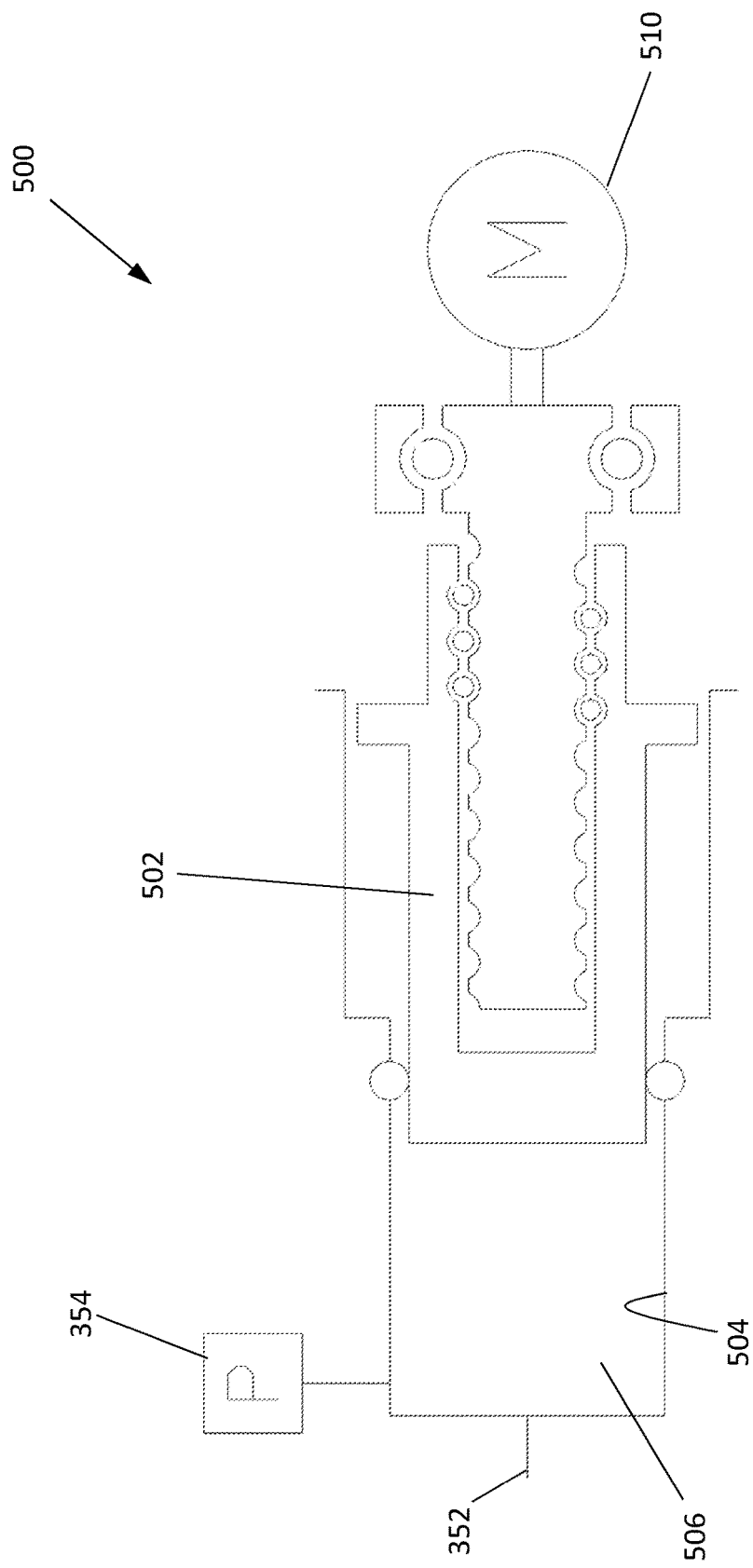
FIG. 5 is a schematic illustration of an alternate embodiment of a plunger assembly which may be used for the plunger assembly of the secondary brake module of FIG. 4.

There is schematically illustrated in FIG. 5 an alternate embodiment of a secondary plunger assembly, indicated generally at 500, which may be used in place of the secondary plunger assembly 356 described above. As mentioned above, the secondary plunger assembly 356 (and the secondary plunger assembly 500) may be of a less expensive or rugged design compared to the plunger assembly 18 due to the reduced operating requirements of the secondary plunger assemblies 356 and 500 compared to the plunger assembly 18. Meeting criteria such as NVH standards (noise, vibration, harshness) may be greatly lowered since the secondary plunger assemblies 356 and 500 are only used during certain events.

The secondary plunger assembly 500 is similar to the secondary plunger assembly 356 in that it includes a piston 502 slidably disposed in a bore 504 of a housing to define a pressure chamber 506. However, the secondary plunger assembly 500 may include a less expensive brushed motor, indicated schematically at 510. The motor 510 may be a brushed DC motor such that is an internally commutated electric motor designed to be run from a direct current power source. The motor 510 can be varied in speed by changing the operating voltage or the strength of the magnetic field. Contrary, a brushless motor or synchronous DC motor, such as the preferred motor design for the motor 412, are powered by DC electricity via an inverter or switching power supply which produces an AC electric current to drive each phase of the motor via a closed loop controller. The controller provides pulses of current to the motor windings that control the speed and torque of the motor.

Additionally, the secondary plunger assembly 500 can be designed without a piston position sensor. Instead, to obtain some correlating travel information, the secondary ECU 358 preferably receives signals from one of the travel sensors, such as the travel sensor 176, mounted in the master cylinder 14. Thus, driver demand or intent can be determined by monitoring the travel sensor 176 as the primary piston 84 moves in the master cylinder 14 caused by depression of the brake pedal 70 during a manual push-through event. The secondary plunger assembly 500 can be operated accordingly based on the travel sensor information since the driver's pedal travel demand is known. The pressure from the pressure sensor 354 can be monitored to assure that the appropriate pressure requirement is being met. Additionally, the secondary ECU 358 need not have to be able to control the simulator test valve 186 since the compensation ports (passageways 104 and 134 moving past seals 100 and 134) of the master cylinder 14 will close off fluid communication with the reservoir 20 during the manual push-through event.

Although use of the secondary brake module 350 was described above with respect to being used during a failure of one or more of the components of the brake system 10, such as during a manual push-through event, the secondary brake module 350 could be triggered on during a non-failed braking event. For example, the secondary brake module 350 could be operated during self-diagnostics.

Although only a single secondary plunger assembly 356 is shown used with the secondary brake module 350, it should be understood that multiple secondary plunger assemblies could be incorporated into the secondary brake module 350. For example, a secondary plunger assembly could be used for each of the brake circuits corresponding to the conduits 36 and 38. The outputs of the two secondary plunger assemblies could connect upstream or downstream of the isolation valves 30 and 32. A single motor may be used to operate the two secondary plunger assemblies.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake system having a wheel brake and being operable under a non-failure normal braking mode and a manual push-through mode, the system comprising:
   a master cylinder operable by a brake pedal during the manual push-through mode to provide fluid flow at an output for actuating the wheel brake;
   a first source of pressurized fluid providing fluid pressure for actuating the wheel brake under the normal braking mode; a first electronic control unit for controlling the first source of pressurized fluid;
   a second electronic control unit, separate from the first electronic control unit, for controlling a secondary brake module;
   a fluid reservoir;
   a solenoid actuated simulator test valve operated by the first and second electronic control units, wherein the simulator test valve is operable to a closed position to prevent the flow of fluid between the master cylinder and the fluid reservoir; and
   the secondary brake module ("SBM") including a plunger assembly having a SBM piston disposed within a bore of the plunger assembly, the SBM being connected to a remaining portion of the brake system by a single conduit; wherein the plunger assembly is configured to increase pressure via forward movement of the SBM piston when in the manual push-through mode and to decrease pressure in the master cylinder via rearward movement of the SBM piston when the brake pedal is released.

2. The brake system of claim 1, wherein the plunger assembly is disposed within a housing thereby defining the secondary brake module, the plunger assembly further defines the bore wherein the SBM piston is slidably disposed in the bore of the plunger assembly, and
   wherein a pressure chamber of the plunger assembly is in fluid communication with an output, and wherein the plunger assembly further includes an electrically operated linear actuator for moving the SBM piston within the bore.

3. The brake system of claim 2, wherein the linear actuator includes an electric motor.

4. The brake system of claim 3, wherein the electric motor is a brushed motor.

5. The brake system of claim 3, wherein the electric motor is brushless.

6. The brake system of claim 3, wherein the linear actuator of the plunger assembly includes a ball screw mechanism operated by the electric motor.

7. The brake system of claim 2, wherein the brake system includes first and second wheel brakes, and wherein the master cylinder is operable during the manual push-through mode to provide fluid flow at first and second outputs for actuating the first and second wheel brakes.

8. The brake system of claim 7, wherein the master cylinder includes:
   a housing defining a bore;
   a first piston slidably disposed in the bore, and wherein the first piston is operable during the manual push-through mode to pressurize a first pressure chamber providing fluid flow at a first output for actuating the first wheel brake; and
   a second piston slidably disposed in the bore, and wherein the second piston is operable during the manual push-through mode to pressurize a second pressure chamber providing fluid flow at a second output for actuating the second wheel brake.

9. The brake system of claim 8, wherein the pressure chamber of the plunger assembly in the secondary brake module is in fluid communication with the first pressure chamber of the master cylinder such that an increase in pressure within the pressure chamber of the plunger assembly in the secondary brake module, via forward movement of the plunger, causes an increase in pressure within the first and second pressure chambers of the master cylinder.

10. The brake system of claim 8 further including:
a first travel sensor in communication with the first electronic control unit for sensing movement of the first piston of the master cylinder; and
a second travel sensor in communication with the second electronic control unit for sensing movement of the second piston of the master cylinder.

11. The brake system of claim 1, wherein the first source of pressurized fluid is a plunger assembly including a housing defining a primary brake module ("PBM") and further defining a bore within the housing, wherein the plunger assembly includes a PBM piston slidably disposed in the bore of the plunger assembly such that movement of the PBM piston pressurizes a PBM pressure chamber when the PBM piston is moved in a forward direction, and wherein the PBM pressure chamber of the plunger assembly is in fluid communication with an output, and wherein the plunger assembly further includes a PBM electrically operated linear actuator for moving the PBM piston within the bore.

12. The brake system of claim 11, wherein when the PBM piston of the plunger assembly in the primary brake module is operated in a second direction opposite the first direction, movement of the PBM piston pressurizes a second pressure chamber which is in fluid communication with a second output.

13. A brake system having first and second wheel brakes and being operable under a non-failure normal braking mode and a manual push-through mode, the system comprising:
a master cylinder operable by a brake pedal during the manual push-through mode, wherein the master cylinder includes
a master cylinder housing defining a bore,
a first piston slidably disposed in the bore, and wherein the first piston is operable during the manual push-through mode to pressurize a first pressure chamber providing fluid flow at a first output for actuating the first wheel brake, and
a second piston slidably disposed in the bore, and wherein the second piston is operable during the manual push-through mode to pressurize a second pressure chamber providing fluid flow at a second output for actuating the second wheel brake;
a pedal simulator in selective fluid communication with the master cylinder;
a simulator valve selectively permitting fluid communication between the master cylinder and the pedal simulator;

a first plunger assembly providing fluid pressure for actuating the first and second wheel brakes under the normal braking mode; and
a secondary brake module ("SBM") including
a second plunger assembly for generating brake actuating pressure in a SBM pressure chamber for actuating the first and second wheel brakes under the manual push-through mode, wherein the SBM pressure chamber of the plunger assembly is in fluid communication with the first pressure chamber of the master cylinder such that an increase in pressure within the SBM pressure chamber of the plunger assembly, via forward movement of an SBM piston within the secondary brake module, causes an increase in pressure within the first and second pressure chambers of the master cylinder and such that a decrease in pressure within the SBM pressure chamber of the plunger assembly, via a rearward movement of the SBM piston within the secondary brake module, causes a decrease in pressure within the first and second pressure chambers of the master cylinder when the brake pedal is released,
a pressure sensor for sensing the pressure within the pressure chamber of the second plunger assembly, and
a single fluid conduit connecting the SBM pressure chamber of the second plunger assembly with a remaining portion of the brake system;
a first electronic control unit for controlling the first source of pressurized fluid disposed in a primary brake module; and
a second electronic control unit, separate from the first electronic control unit, for controlling the secondary brake module, and wherein the second electronic control unit is connected with the pressure sensor of the secondary brake module.

14. The brake system of claim 13 further including:
a first travel sensor in communication with the first electronic control unit for sensing movement of the first piston of the master cylinder; and
a second travel sensor in communication with the second electronic control unit for sensing movement of the second piston of the master cylinder.

15. The brake system of claim 13, wherein the first plunger assembly is disposed within a housing thereby defining a primary brake module ("PBM") and the plunger assembly also defining a bore, wherein the first plunger assembly includes a PBM piston slidably disposed in the bore of the first plunger assembly such that movement of the PBM piston pressurizes a PBM pressure chamber when the PBM piston is moved in a forward direction, and wherein the PBM pressure chamber of the first plunger assembly is in fluid communication with an output, and wherein the first plunger assembly further includes an electrically operated linear actuator for moving the PBM piston within the bore.

16. The brake system of claim 15, wherein when the PBM piston of the first plunger assembly is operated in a rearward direction opposite the forward direction, movement of the PBM piston pressurizes a second PBM pressure chamber which is in fluid communication with a second output.

* * * * *